US009702596B2

(12) United States Patent
Shaaban et al.

(10) Patent No.: US 9,702,596 B2
(45) Date of Patent: Jul. 11, 2017

(54) DRY COOLING SYSTEM USING THERMALLY INDUCED VAPOR POLYMERIZATION

(71) Applicant: Applied Research Associates, Inc., Albuquerque, NM (US)

(72) Inventors: Aly H. Shaaban, Panama City, FL (US); Gong Zhou, Panama City, FL (US); Sergio Escobar, Panama City, FL (US); Joshua J Mormile, Panama City, FL (US); Desiree A Kettell, Panama City, FL (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

(21) Appl. No.: 15/370,355

(22) Filed: Dec. 6, 2016

(65) Prior Publication Data

US 2017/0159981 A1 Jun. 8, 2017

Related U.S. Application Data

(60) Provisional application No. 62/264,392, filed on Dec. 8, 2015.

(51) Int. Cl.
*F25B 23/00* (2006.01)
*F01K 17/02* (2006.01)
*F01K 7/16* (2006.01)
*C09K 5/16* (2006.01)

(52) U.S. Cl.
CPC .............. *F25B 23/00* (2013.01); *C09K 5/16* (2013.01); *F01K 7/16* (2013.01); *F01K 17/02* (2013.01)

(58) Field of Classification Search
CPC . F25B 23/00; F01K 17/02; F01K 7/16; C09K 5/16
See application file for complete search history.

(56) References Cited

U.S. PATENT DOCUMENTS

| 5,584,193 | A | 12/1996 | Biermann |
| 2010/0300093 | A1 | 12/2010 | Doty |
| 2013/0224078 | A1 | 8/2013 | Van Grambezen et al. |
| 2015/0338172 | A1 | 11/2015 | Fiorotto et al. |

OTHER PUBLICATIONS

Bell, et al., "Kinetics of the Depolymerisation of Kinetics of the Depolymerisation of Paraldehyde in Aqueous Solution", J. Chem. Soc., pp. 774-778, 1954.
Flueckiger et al., "Thermodynamic and kinetic invenstigation of a chemical reaction-based miniature heat pump", Energy Conversion and Management 64, pp. 222-231, 2012.
(Continued)

*Primary Examiner* — Michael C Miggins
(74) *Attorney, Agent, or Firm* — Dinsmore & Shohl LLP; Monika L'Orsa Jaensson, Esq.

(57) ABSTRACT

A system and method for providing dry cooling of a source liquid, having a plurality of heat exchangers which depolymerize and polymerize a polymer. Specifically, the depolymerization process is endothermic and draws heat from a source liquid in a first heat exchanger, and the polymerization process is exothermic and expels heat from a second heat exchanger. Additional heat exchangers and holding tanks may be incorporated in the system and method. In some embodiments the system further provides additional cooling of the polymer prior to depolymerization using cooler night ambient air.

17 Claims, 7 Drawing Sheets

(56) References Cited

OTHER PUBLICATIONS

Kawasaki et al., "Proposal of a chemical heat pump with paraldehyde depolymerization for cooling system", Applied Thermal Engineering 19, pp. 133-143, 1999.

Kawasaki et al., "Characteristics of Chemical Heat Pump through Kinetic Analysis of Paraldehyde Depolymerization", Journal of Chemical Enginneering of Japan, vol. 31, No. 33, pp. 374-380, 1998.

Singh et al., "Ambient Air Temperature Effect on Power Plant Performance", International Journal of Engineering Science and Technology, vol. 4, No. 8, pp. 3916-3923, Aug. 2012.

Tanabe et al., "The Mechanism of Depolymerization of Paraldehyde Catalyzed by Solid Acid", J. Res. Inst. Cat. Hokkaido Univ. 8(1), pp. 43-50, 1960.

U.S. Environmental Protection Agency (EPA), "Technical Development Document for the Final Regulations Addressing Cooling Water Intake Structures for New Facilities", Docket No. EPA-821-R-01-036, Nov. 2001.

Epri, "Comparison of Alternate Cooling Technologies for U.S. Power Plants: Economic, Environmental, and Other Tradeoffs", 2004.

International Search Report and Written opinion relating to International Patent Application No. PCT/US2016/065259.

FIGURE 1: (PRIOR ART)

DRY COOLING SYSTEM USING THERMALLY INDUCED VAPOR POLYMERIZATION

BACKGROUND OF THE DISCLOSED TECHNOLOGY

The disclosed technology regards a cooling system which can function to provide power plant condensers with cooling water at desirable temperature levels to maintain turbine power production at optimum thermal efficiency levels. The technology may also replace the power plant condenser, and provide the power plant low-pressure-turbine with return water at temperatures to achieve the turbine's designed optimum back pressure at any ambient conditions. The disclosed technology further relates to an improvement in dry cooling systems to overcome the inherent thermodynamic performance penalty of air-cooled systems, particularly under high ambient temperatures. The disclosed technology has other applications, including providing cooling and heating in air conditioning systems, and generally in the removal of heat from liquid sources in a controlled environment, as well as streams or other water sources in the natural environment. Using the methods of the technology, heat generated by the system may also be used to warm an environment or another liquid source.

More than 86% of electricity in the United States of America is produced by thermoelectric power generating plants, most of which use coal, natural gas, or nuclear power to generate thermal energy. As shown in FIG. 1, the thermal energy produces superheated steam in the boiler, which drives a steam turbine to produce electrical power by the generator. Each power plant is designed for the conditions of its particular geographic location, which conditions impact the design point of the low pressure turbine exhaust pressure. The exhausted steam coming out of the turbine last stage is condensed in a condenser by cooling heat transfer with the condenser, then pumped back to the boiler as boiler return water, and the process is repeated. Although unique to each plant, the return condensate water ranges in temperature from 35° C. to 52° C.

The pressure of the outlet steam causing the turbine blade rotation, called back pressure, is defined by the condenser temperature. For dry cooling systems, the condenser temperature is a strong function of the ambient temperature. Therefore, an increase in ambient temperature directly affects the power plant efficiency. For indirect cooling systems, the ambient air increases the cooling water temperature which in turn increases the condenser temperature. However, for direct air cooled systems the condenser temperature is directly influenced by the ambient temperature.

Typically, more than 60% of the original energy generated by the steam turbine is wasted and carried away as low-grade heat by the plant condenser cooling water or directly dissipated to the ambient air. Operators must remove this heat, and 99% of baseload thermoelectric plants in the United States of America use water-cooled systems, or wet cooling, to remove the heat from the condenser cooling water. Power plant operators prefer wet cooling over dry-cooling systems because ambient water temperatures tend to be cooler and more stable than ambient air temperatures; further, water evaporation allows for additional cooling capacity, enabling more cost-effective rejection of heat. However, the wet cooling processes lead to a significant amount of water loss, with power plants using wet-cooling systems currently accounting for 41% of all fresh water withdrawals in the United States of America.

Availability of fresh water resources is increasingly strained by drought and growing demands, and potential climate change impacts add uncertainty to the quality and quantity of future water supplies. However, while dry-cooling technologies do not result in significant water use, because of their sensitivity to ambient air temperatures current dry-cooling technologies drive down the overall efficiency of power generation compared with the efficiency of wet cooled condensers. Therefore, there is a need for a dry-cooling technology that eliminates water loss or the dependency on water while maintaining the high operating efficiencies of electric power generation presently achieved by wet-cooling technologies.

Power plant condenser cooling is divided into five main technology areas, which differ greatly in the amounts of water consumed: (1) once-through cooling; (2) closed-cycle wet cooling; (3) cooling ponds; (4) dry cooling; and (5) hybrid cooling.

Once-through cooling systems withdraw cold water from, and return heated water to, a natural body of water such as a lake, a river, or the ocean. In operation, the source water is pumped through the tubes of a steam condenser. As steam from the turbine condenses on the outside of the tubes, the heat of condensation is absorbed by the source water flowing through the tubes. The source water exiting the condenser, warmed by 15° F. to 30° F. depending on system design, is discharged to the original source. The amount withdrawn varies from 25,000 to 50,000 gallons/MWh. Although none of the water is consumed within the plant, some consumptive loss results from enhanced evaporation from the surface of the natural body of water due to the heated water discharge. The loss due to this enhanced evaporation is not well known and is expected to be site-specific, but it has been estimated as 0.5% to 2% of the withdrawn source water amount, or 125 to 1000 gallons/MWh. The biggest drawback of once-through cooling systems is that heated discharges may degrade the natural body of water, increasing the overall water temperature of the natural body of water. The thermal pollution is most significant when the source of the water is a river or other body with limited volume, where the water withdrawn and discharged is a significant portion of the natural water flow.

Closed-cycle wet cooling is similar to once-through cooling in that as cold source water flows through the tubes of a steam condenser, steam from the turbine condenses on the outside of the tubes. However, instead of returning the heated condenser water to its source, it is pumped to a wet cooling device such as a cooling tower, cooling pond, or cooling canal, where it is cooled by evaporation of a small portion of the water to the atmosphere to within 5° F. to 10° F. of the ambient wet-bulb temperature. Makeup water is added to compensate for the water loss due to evaporation and the again cooled water is then recirculated to the steam condenser.

Wet cooling devices used in closed-cycle wet cooling transfer thermal energy from heated cooling water to the atmosphere through both heat transfer to the ambient air and evaporation, to bring the cooling water to near wet-bulb air temperature. Specifically, as ambient air is drawn past a flow of cooling water, a small portion of the water evaporates, and the energy required to evaporate that portion of the water is taken from the remaining mass of water, thus reducing its temperature. About 970 Btu of thermal energy is absorbed for each pound of water evaporated.

To achieve better performance, heated cooling water may be sprayed to a medium, called fill, to increase the surface area and the time of contact between the air and water flow.

Some systems use splash fill, which is material placed to interrupt the water flow causing splashing. Other systems use film fill, which includes thin sheets of material (usually PVC) upon which the water flows, enhancing evaporation.

Cooling towers draw air either by natural draft or mechanical draft, or both. Natural draft cooling towers utilize the buoyancy of warm air, and a tall chimney structure. In this structure the warm, moist air naturally rises due to the density differential compared to the dry, cooler outside air, producing an upward current of air through the tower. Hyperbolic towers have become the design standard for natural draft cooling towers due to their structural strength and minimum usage of material. The hyperbolic shape also aids in accelerating air flow through the tower, and thus increases cooling efficiency. Mechanical draft towers use motor-driven fans to force or draw air through the towers, and include induced draft towers which employ a fan at the top of the tower that pulls air up through the tower (as shown in FIG. 1), and forced draft towers which use a blower-type of fan at the bottom of the tower, which forces air into the tower.

Cooling ponds are man-made bodies of water which supply cooling water to power plants, and are used as an effective alternative to cooling towers or once-through cooling systems when sufficient land, but no suitable natural body of water, is available. The ponds receive thermal energy from the heated condenser water, and dissipate the thermal energy mainly through evaporation. The ponds must be of sufficient size to provide continuous cooling, and makeup water is periodically added to the pond system to replace the water lost through evaporation.

Current dry cooling systems can be a direct system, in which turbine exhaust steam is condensed in an air-cooled condenser (ACC), or an indirect system, in which the steam is condensed in a conventional water-cooled condenser. For indirect systems, the heated cooling water is circulated through an air-cooled heat exchanger before returning to the water-cooled condenser. In the direct system, the steam is condensed in the ACC in finned tube bundles (galvanized steel tubes with aluminum fins), and the heat is dissipated directly to the ambient air. Direct and indirect cooling systems operate without water loss (other than a small amount of water used to periodically clean the air-side surfaces of the air-cooled condenser or heat exchanger). The condensing temperature, in the case of direct dry cooling, or the cold water temperature, in the case of indirect dry cooling, is limited by the ambient air temperature, which is always higher than the ambient dry-bulb temperature. Although dry cooling achieves significant water savings, the capital and operating costs are much higher than they are for closed-cycle wet cooling, and the physical footprint is larger. Furthermore, plant performance is reduced in the hotter times of the year when the steam-condensing temperature (and hence the turbine exhaust pressure) is substantially higher (being limited by ambient air temperature) than it would be with wet cooling.

Another dry cooling system is the Heller System, which uses a direct contact condenser instead of a steam surface condenser. In this system the turbine exhaust steam is in direct contact with a cold water spray, and no condenser tubes are used. The resulting hot condensate and water mixture are pumped to an external air-cooled heat exchanger. The air-cooled heat exchanger may have a mechanical draft design, a natural draft design or a fan-assisted natural draft design. The direct contact condenser has the advantage of lower terminal temperature difference (TTD, which is the temperature difference between the saturation steam temperature and the cooling water outlet temperature), and thus lower turbine back-pressure.

Hybrid cooling systems have both dry and wet cooling elements that are used alternatively or together to achieve the best features of each system. In a hybrid cooling system a power plant can achieve the wet cooling performance on the hottest days of the year, and the water conservation capability of dry cooling at other times. The wet and dry cooling components can be arranged in series, or in parallel, and may be separate structures or integrated into a single tower. The dry cooling system elements can be either direct or indirect types. The most common configuration for hybrid cooling systems to date has been parallel, separate structures with direct dry cooling.

Like the wet cooling systems described hereinabove, the wet cooling elements of a hybrid system use significant amounts of water, particularly during the summer months. Therefore, it is most suitable for sites that have significant water availability but not enough for all-wet cooling at all times of the year. For sites where water use is highly limited or contentious, even the use of 20% of the all-wet amounts might be unacceptable, requiring all-dry cooling to allow the plant to be permitted. For sites with adequate water, the performance and economic advantages of all-wet cooling systems are significant. In some cases, plant siting might be eased by evidence of "responsible citizenship," in which by means of a hybrid cooling system a plant developer offers some degree of reduced water use to the local community concerned about water for agriculture, recreation, or industry.

The disclosed technology overcomes the aforementioned problems associated with power plant condenser cooling. A broad object of the disclosed technology is to provide a novel method and apparatus for removal of waste heat from power plant condensers with high overall process thermal efficiency and without water waste.

Another object of the disclosed technology is to provide for power plant cooling in a relatively compact apparatus, by maximizing the thermal capacities of the apparatus. A further object of the disclosed technology is to provide a dry cooling system and method of dry cooling for effective heat removal or heat generation, operating at a high coefficient of performance.

GENERAL DESCRIPTION OF THE DISCLOSED TECHNOLOGY

In accordance with the above objects, the disclosed technology relates to cooling systems and methods which function to provide power plant condensers with return water at the necessary temperature levels to maintain power production at their optimum thermal efficiency levels. Optimum condenser temperature varies depending on the power plant's design and its geographic location. Condenser temperature design for combined cycle and steam power plants ranges between 35-52° C. As hereinabove discussed, the condenser's ability to lower supply water/condensate temperature determines the back pressure for the low-pressure steam turbine, wherein an increase in condenser temperature increases the back pressure on the turbine blades, leading to reduced power plant efficiency.

The disclosed technology may also replace the power plant condenser, or be used to improve other dry cooling systems. The disclosed technology further may be used in other applications, such as providing cooling and heating in air conditioning systems, and generally in the removal of heat from waste/stream heat sources.

The disclosed technology is specifically useful in a power plant's dry cooling system, using the depolymerization of a polymer over a catalyst in a closed system, including in liquid communication a plurality of heat exchangers configured to form depolymerization and polymerization assemblies. In some embodiments a cold energy storage assembly is also provided.

The depolymerization process and assembly of the disclosed technology depolymerizes a polymer over a catalyst, resulting in a monomer rich vapor. This depolymerization process is an endothermic reaction, drawing heat from the source water (e.g., condenser water or steam exiting the low pressure turbine, last stage) flowing through the heat exchanger in a depolymerization cooling unit (DCU).

The monomer rich vapor is then transferred to the polymerization assembly, reacting over an acid catalyst bed in a polymer heating unit (PHU) to convert the monomer back to the original polymer in liquid phase. The polymerization process is an exothermic reaction, and heat generated may be expelled from the heat exchanger vessel of the polymerization assembly by either air cooled or liquid cooled processes. In some embodiments, the polymerization assembly employs the dry cooling approach to expel heat from the PHU, using air cooled heat exchangers. To complete the cycle, the polymer stream is pumped by a liquid pump back to the DCU to provide below ambient wet bulb temperature cooling for a standalone cooling system.

To achieve continuous operation with high conversion efficiencies, the system may include one or more polymer separation units (PSU), whereby using heat from an independent stream of source liquid, the monomer vapor rich mixture from the DCU and/or the polymer rich liquid mixture from the PHU are further separated into two streams: a vaporous light monomer rich stream and a liquid polymer rich stream. The PSU(s) thereby creates a buffer between the DCU and the PHU. In some embodiments a single PSU is placed downstream of the DCU and downstream from the PHU, enhancing polymer/monomer separation from each assembly. In another embodiment, a first PSU can be placed downstream of the DCU, enhancing polymer-monomer separation from the DCU product vapor stream, and a second PSU is placed downstream of the PHU, enhancing polymer-monomer separation from the PHU product liquid stream. In either of these configurations, the light monomer-rich stream from the PSU(s) is circulated into the PHU for further polymerization reaction, while the polymer-rich liquid stream from the PSU(s) is circulated directly to the DCU for depolymerization, or collected in a holding tank for later circulation through the DCU.

To provide supplemental cooling below ambient wet bulb temperatures during hot summer days with temperatures higher than the saturation temperature at steam turbine back pressure, the elevated temperature polymer produced in the PHU may be stored in a cold energy storage assembly, having a day storage tank (DST) which stores the elevated temperature polymer from the PHU (or the PSU). In the evening, the elevated temperature polymer cycles through a polymer cooling heat exchanger unit (PCU), dissipating its sensible heat into the cooler evening ambient air. The lower temperature polymer may then be stored in a cold energy storage tank (CST), where it waits for reuse the next day by pumping the liquid polymer to the DCU, and the cycle is repeated.

For optimal performance, the polymer should be selected based on the temperature range in which it depolymerizes and polymerizes, wherein in the power plant condenser cycle the temperature range of depolymerization is comparable with the power plant's cooling system operating temperatures, and the temperature range of polymerization exceeds the hottest ambient air summer temperatures at the site. Other temperature ranges may be suitable in other applications, and therefore other polymers may be more suitable.

In an exemplary embodiment of the disclosed technology, the liquid polymer is paraldehyde, which is depolymerized in the DCU into the light monomer acetaldehyde over an acid based catalyst. The acetaldehyde rich vapor, having a small amount of paraldehyde gas, is actively removed from the DCU as vapor using a blower, compressor or vacuum pump. This active removal of acetaldehyde rich vapor allows the paraldehyde to be depolymerized beyond its chemical equilibrium. The depolymerization and resulting vaporization process are endothermic, resulting in heat absorption from the source liquid flowing through the heat exchanger of the DCU. The maximum coolant specific energy, estimated based on 100% depolymerization conversion, is 1,434 kJ/kg. In practical operation, the depolymerization process can be controlled by varying operating parameters with high conversion up to 95%, providing a coolant specific energy up to 1,363 kJ/kg to meet cooling needs. This practical coolant specific energy is up to 4 times of the latent heat storage capacity of ice.

The monomer conversion of acetaldehyde in the polymerization process of the PHU is typically between 60-80%, depending on the process temperature (e.g., ambient air temperature for an air cooled heat exchanger). However, as hereinabove discussed remaining light and liquid monomer can be separated from the polymer rich liquid in the PSU, and excess light monomer can be recycled back to the polymerization assembly. With this recycling, the overall monomer conversion may reach 95%. Thereby, the exothermic process has polymerization conversions that match the depolymerization conversions for the endothermic process, allowing the cycle to be operated continuously and efficiently as a heat pump cycle by removing heat from the cooling process, and rejecting that heat from the heating process, with overall coolant energy density up to 1,363 kJ/kg.

The disclosed technology further provides a process for an efficient dry cooling system to dissipate low quality heat from chemical, mechanical, thermal, or power plant operations. It can work as a standalone system, or be synchronized with other dry cooling units. Further, it is contemplated that the exothermic polymerization process may be used as a heat source for other processes or purposes, such as for example a distillation unit.

The cycle of the disclosed technology operates based on chemical heat pump fundamentals and utilizes chemical thermal energy storage. Therefore, it is more tolerant to ambient temperature fluctuation than traditional dry cooling technology such as air cooled heat exchangers. For example, at an ambient temperature of 45° C., air cooling of a 45° C. water stream is impossible since there is no driving force for the heat transfer between water and air. With the cycle of the disclosed technology at the same ambient temperature condition, the endothermic process will lower the coolant/polymer temperature, allowing heat transfer between the water and the coolant. Using paraldehyde as the polymer, even under conditions when the coolant/polymer is fed at temperatures higher than the hottest ambient temperatures, the coolant performance will observe less than 1.4% performance penalty per 10° C. increase in polymer temperature. This behavior is caused by the small ratio between the paraldehyde sensible heat capacity and the overall reaction specific enthalpy change. Specifically, the sensible heat capacity for paraldehyde is 0.27 kJ/mol/C; therefore, the sensible heat storage for 10° C. temperature change is only 2.7 kJ/mol, which only accounts for 1.4% of total reaction heat (189.5 kJ/mol). For example the increase in the polymer temperature from 25-35° C. reduces the DCU cooling capacity by 1.4% (a polymer feed at 25° C. gives a DCU cooling capacity of 1 kW; when its temperature increases to 35° C., its cooling capacity is reduced to 0.986 kW). Similarly, the monomer will regenerate in the polymerization process with a process temperature higher than the ambient 45° C. temperature, allowing heat to be rejected to the environment using a traditional air cooled heat exchanger. Thus, the cycle of the disclosed technology allows the system to provide efficient cooling at high ambient temperatures, when traditional dry cooling methods fail.

FIGURES

Embodiments of the invention will now be described in conjunction with the accompanying drawings, where:

DETAILED DESCRIPTION OF THE DISCLOSED TECHNOLOGY

Figure 1:
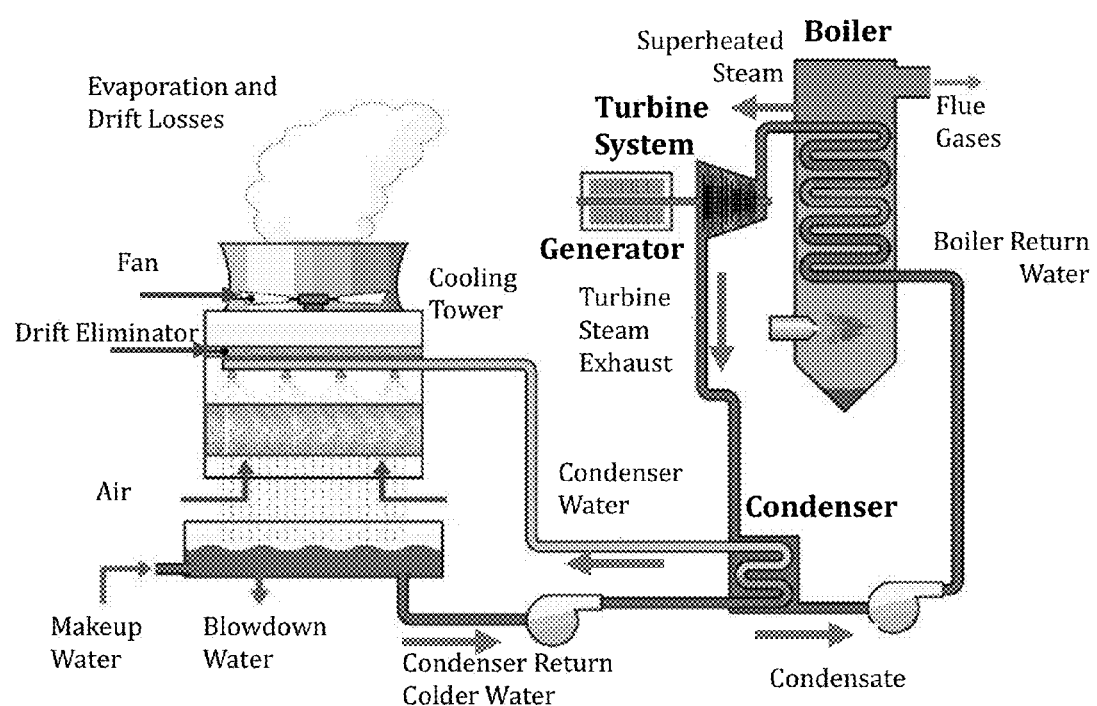
FIG. 1 is a flow diagram of a prior art thermoelectric coal or natural gas fire steam power plant, using a cooling tower wet cooling system.

The features and principles of the disclosed technology are described in details and through embodiments below, with reference to the indicated figures. The particular embodiments of the disclosed technology are presented as examples, and should not be understood as limitations of the claimed inventions. The novel features of the disclosed technology can be employed as numerous embodiments within the scope of the disclosed technology. Additional heat exchangers, pressure regulating control devices, and other ancillary equipment necessary for operation of the disclosed technology in accordance with the teachings of this disclosure, the use of which are well known in the art, are not shown in the schematic figures. A person skilled in the art may readily see that various configurations of heat exchangers, pumps, blowers and other standard processing equipment may be employed to achieve desired process stream temperatures and pressures, while maximizing the overall process thermal efficiency.

The present technology uses a depolymerization and polymerization thermochemical cycle to provide dry cooling to a condenser or other water source, eliminating water losses and maintaining power plant thermal efficiency even during the hottest time of the year. One of polymers suitable for use in the disclosed technology is paraldehyde, which depolymerizes to the monomer acetaldehyde. Other systems may use polymers with higher depolymerization temperatures when appropriate for purposes of the system, for example when the system is used to cool low quality waste heat streams (<200° C.).

The disclosed technology uses polymerization [paraldehyde (Pa(l):$C_6H_{12}O_3$(l))], depolymerization [acetaldehyde (A(l):$CH_3CHOCH_3CHO$)] and vaporization [acetaldehyde ((A(g):$CH_3CHOCH_3CHO$))] thermochemical reactions cycle for cooling purposes. The equations representing the chemical reaction of the depolymerization of paraldehyde and vaporization of acetaldehyde are indicated in equations 1 and 2:

$$C_6H_{12}O_3 \text{ (l)} \leftrightarrow 3CH_3CHO \text{ (l)}, \Delta H_{298K}=110.3 \text{ kJ/mol} \quad (1)$$

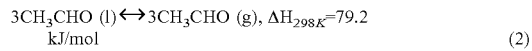

$$3CH_3CHO \text{ (l)} \leftrightarrow 3CH_3CHO \text{ (g)}, \Delta H_{298K}=79.2 \text{ kJ/mol} \quad (2)$$

The net reaction is then:

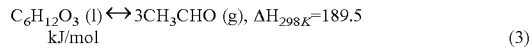

$$C_6H_{12}O_3 \text{ (l)} \leftrightarrow 3CH_3CHO \text{ (g)}, \Delta H_{298K}=189.5 \text{ kJ/mol} \quad (3)$$

One mole of liquid paraldehyde is depolymerized over an acid catalyst, into three moles of gaseous acetaldehyde. The depolymerization reaction is endothermic with a net reaction heat of 189.5 kJ/mol (as the sum of reaction heat and vaporization heat).

Although the depolymerization reaction is reversible, it is promoted by the vaporization and removal of the monomer. Specifically, in a typical depolymerization reaction without the active removal of light monomer, the reaction will start first by depolymerizing the polymer to produce light monomer. However, because this is a reversible reaction, as the polymer is being depolymerized, the produced light monomer will try to convert (re-polymerize) back to the polymer. The depolymerization and re-polymerization rates depend on the concentration of the polymer and the light monomer in the liquid at a given temperature and pressure. In general, higher concentrations will result in a faster reaction rate. Therefore, high polymer concentration will lead to a high depolymerization rate and high light monomer concentration will lead to a high re-polymerization rate. Eventually, both polymer and light monomer concentrations in the liquid will reach a state where the depolymerization and re-polymerization rate are equal and the polymer and monomer concentrations will remain constant. Thus the depolymerization conversion is limited by the reaction equilibrium.

At the equilibrium state, the resulting mixture is a liquid and the monomer (having a very low boiling point as compared to the polymer) will slowly evaporate from the liquid mixture. Actively removing the monomer rich vapor from the DCU (by means of a blower, for example) creates a low pressure environment, accelerating the evaporation rate of the monomer. As the light monomer concentration decreases (through both removal of the monomer and additional polymer feed), the depolymerization reaction dominates to produce more light monomer to reach the equilibrium.

For example, at 40° C., the equilibrium polymer and light monomer concentrations are about 83 wt % and 17 wt % in liquid, respectively. If pure polymer is fed to the DCU and evaporation is negligible, the overall depolymerization conversion is calculated based on liquid composition (17%). By equalizing the evaporation rate (by removal of the monomer rich vapor) and the polymer feed rate, the overall depolymerization conversion is calculated based on the vapor composition. If the vapor composition is 90 wt % of light monomer (average light monomer composition under test conditions), the overall depolymerization conversion is 90%. Thus, by active removal of the monomer from the reaction tank the overall depolymerization conversion is significantly higher than the equilibrium conversion.

The system of the disclosed technology utilizes the high reaction heat of the depolymerization of paraldehyde for cooling a source liquid. With its net reaction heat of 189.5 kJ/mol, the heat capacity of the system can be calculated by equation 4, where 132.16 g/mol is the paraldehyde molecular weight.

$$189.5 \frac{kJ}{mol} \div 132.16 \frac{g}{mol} \times 1000 \frac{g}{kg} = 1,434 \frac{kJ}{kg} \quad (4)$$

The 1,434 kJ/kg is the maximum theoretical cold energy storage achievable. The depolymerization and vaporization processes operate in the temperature range of 4–45° C., under pressure applied in a range of 3-12 pound per square inch absolute (psia); in the embodiments hereinafter described, pressure from a blower is applied in the range of 4-9 psia.

After depolymerization, acetaldehyde gas can be re-polymerized to paraldehyde liquid over an acid catalyst. The polymerization process (acetaldehyde to paraldehyde) operates in the temperature range of 26-55° C., under pressure ranges from 10 to higher than 14.9 psia; in the embodiments herein described, pressure from a blower is applied in the range of 10-16 psia.

Figure 2:
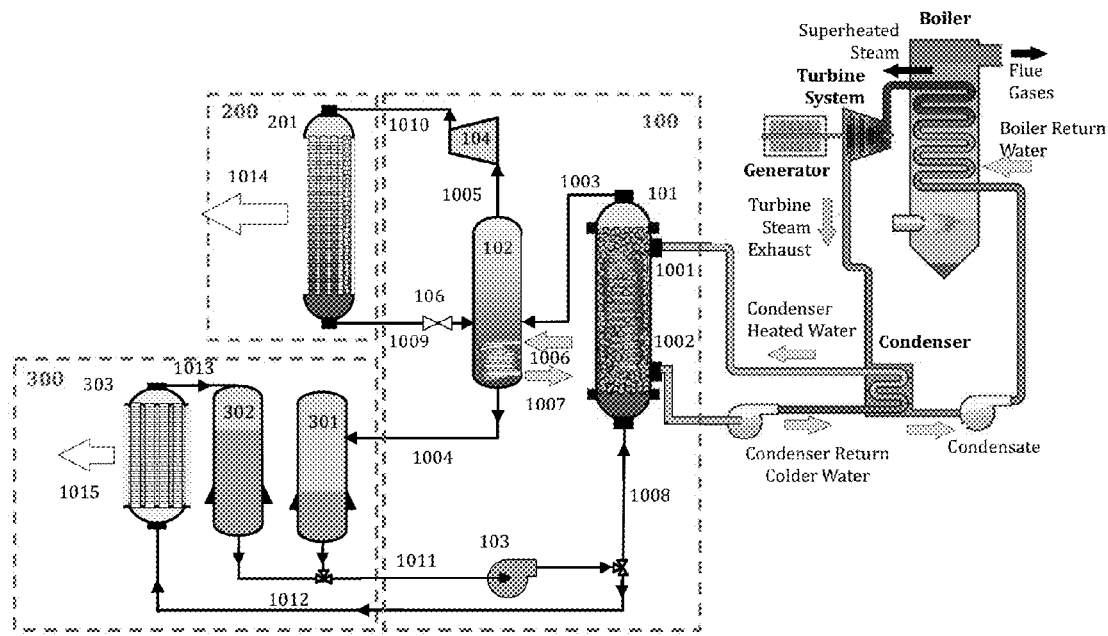
FIG. 2 is a flow diagram of a thermoelectric coal or natural gas fire steam power plant, including an embodiment of the apparatus of the disclosed technology in an indirect dry cooling configuration
Figure 3:
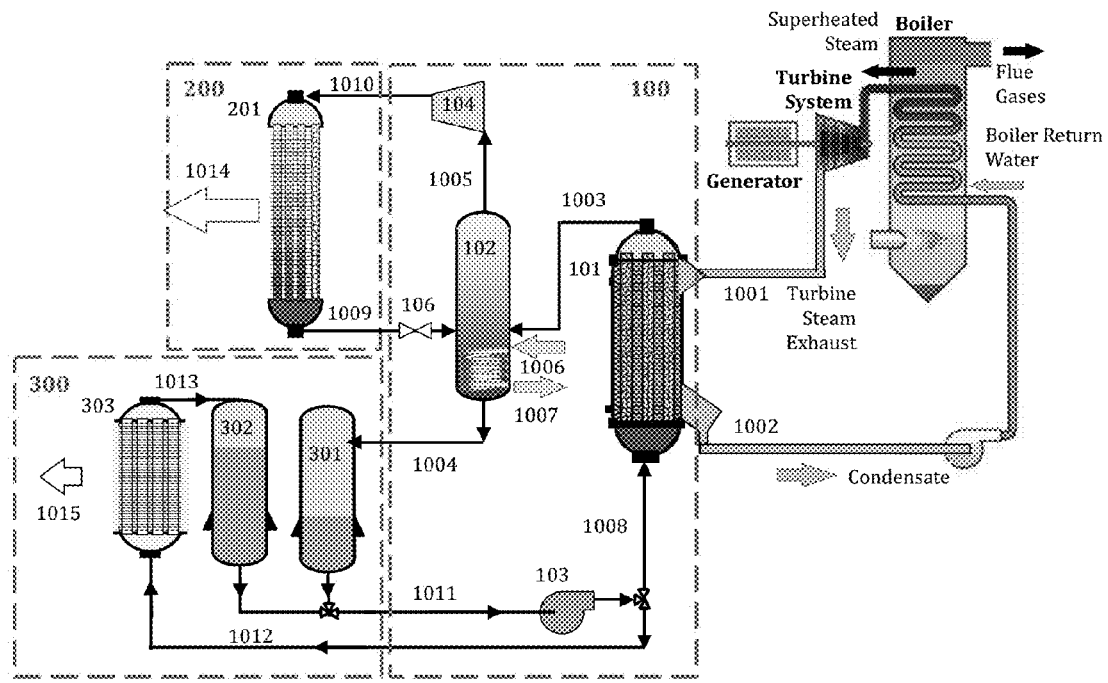
FIG. 3 is a flow diagram of a thermoelectric coal or natural gas fire steam power plant, including an embodiment of the apparatus of the disclosed technology in a direct dry cooling configuration.
Figure 4:
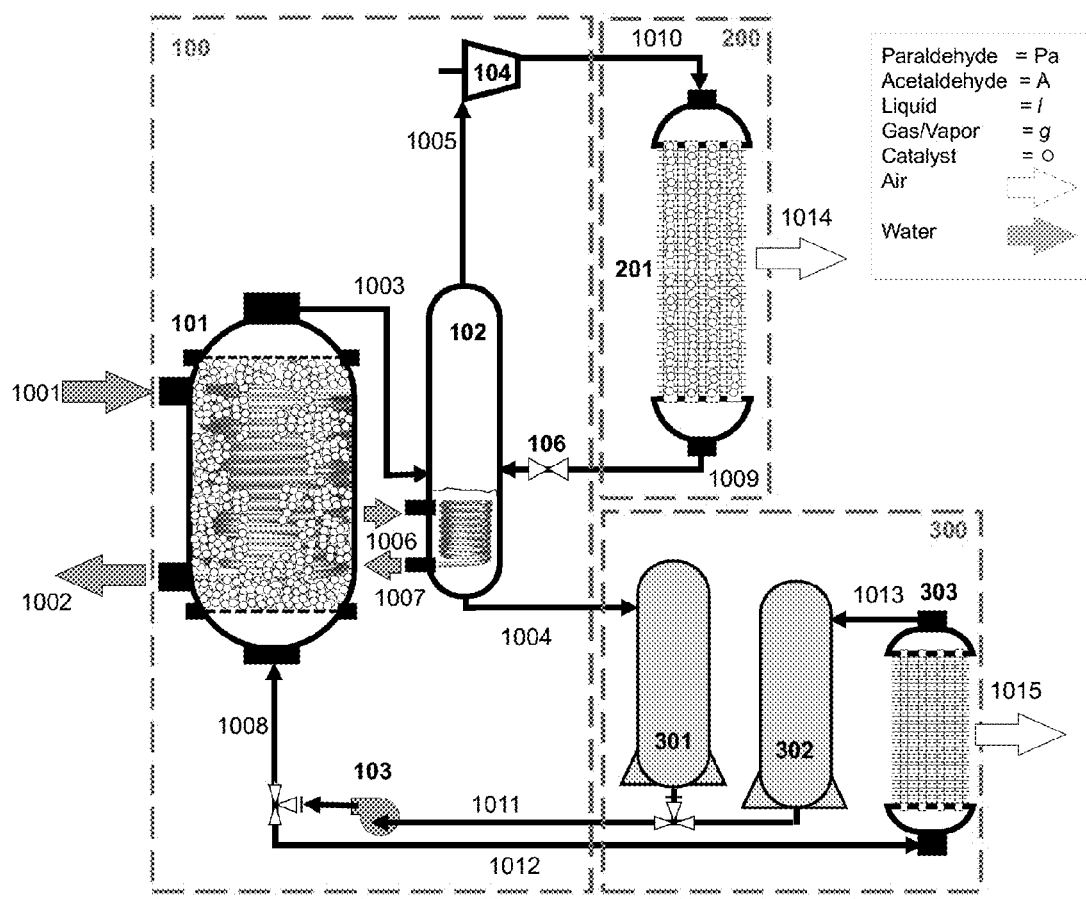
FIG. 4 is a schematic process flow diagram of an embodiment of the apparatus of the disclosed technology, using cold energy storage.

Shown in FIGS. 2-4 is a schematic process flow diagram of an embodiment of the disclosed technology, including an apparatus that includes cold energy storage, having three distinct assemblies in liquid communication: a depolymerization assembly 100, a polymerization assembly 200, and cold energy storage assembly 300. In this embodiment the depolymerization assembly 100 includes a DCU 101, a PSU 102, a liquid pump 103, and a blower 104. The polymerization assembly 200 includes a PHU 201. The cold energy storage assembly 300 includes a day storage tank (DST), 301, a polymer cooling unit (PCU) 303 and a cold-energy storage tank (CST) 302. Each of the DCU 101 and the PHU 201 of the assemblies are configured as heat exchangers, wherein catalytic reactions occur and heat is exchanged. The PSU 102 and the PCU 303 are also configured as heat exchangers, although no catalytic reaction is intended in these tanks. Tanks 105 (hereinafter described), 301 (PCU) and 302 (CST) are all storage tanks, not intended to be significant heat exchangers. The tanks and vessels should be made from materials that are compatible with the selected system polymer and its monomer; stainless steel is a suitable material for these tanks and vessels. The DCU 101 and the CST 302, and other heat exchanger vessels and tanks of the embodiments of the disclosed technology may be wrapped in heat insulation, designed as double walled tanks, or may otherwise be insulated from ambient air conditions.

The configuration of the heat exchanger tanks 101, 102, 201, and 303 may be independently configured to maximize heat transfer and obtain the right temperature at the flows' exit. The DCU 101 and the PSU 102 are heat exchangers designed to receive source liquid, and transfer heat therefrom to the respective depolymerization and separation reactions within the tanks. Liquid to multiphase fluids heat exchangers, such as shell and tube heat exchangers, with straight or coiled tubes, counter or parallel flow, single or double pass, are all suitable heat exchangers to accomplish this heat transfer; other heat exchangers may also be suitable for purposes of these reactors of the disclosed technology. The DCU 101 contains an acid based catalyst in the polymer flow portion of the reactor.

The PSU 102 may be a vapor-liquid separator designed with the inlet mixtures from the DCU 1003 and the PHU 1009 to be separated to monomer rich vapor 1005 (greater than 80 wt % monomer, and in some embodiments greater than 90 wt % monomer gas) and polymer rich liquid 1004 (greater than 80 wt % polymer, and in some embodiments greater than 90 wt % polymer liquid), under the applications' pressure and temperature conditions. Other vapor-liquid separator designs including, but not limiting to, fractionation and distillation column design, can also be employed in the PSU to provide high separation efficiency and effectiveness. In some embodiments, a level control mechanism such as a float level switch is used to allow the accumulation of the polymer rich liquid at the bottom of the PSU; when the level is reached, the PSU outlet port is opened and the accumulated polymer rich liquid stream is discharged from the PSU.

The PHU 201 may be configured as an air-to-gas/multi-phase heat exchanger, such as a tube and fin heat exchanger, with an acid based catalyst in the flow portion of the reactor. The PCU 303 may be configured as an air-to-liquid heat exchanger, such as a tube and fin heat exchanger. Other heat exchanger configurations may be suitable for purposes of these reactors of the disclosed technology.

Figure 8:
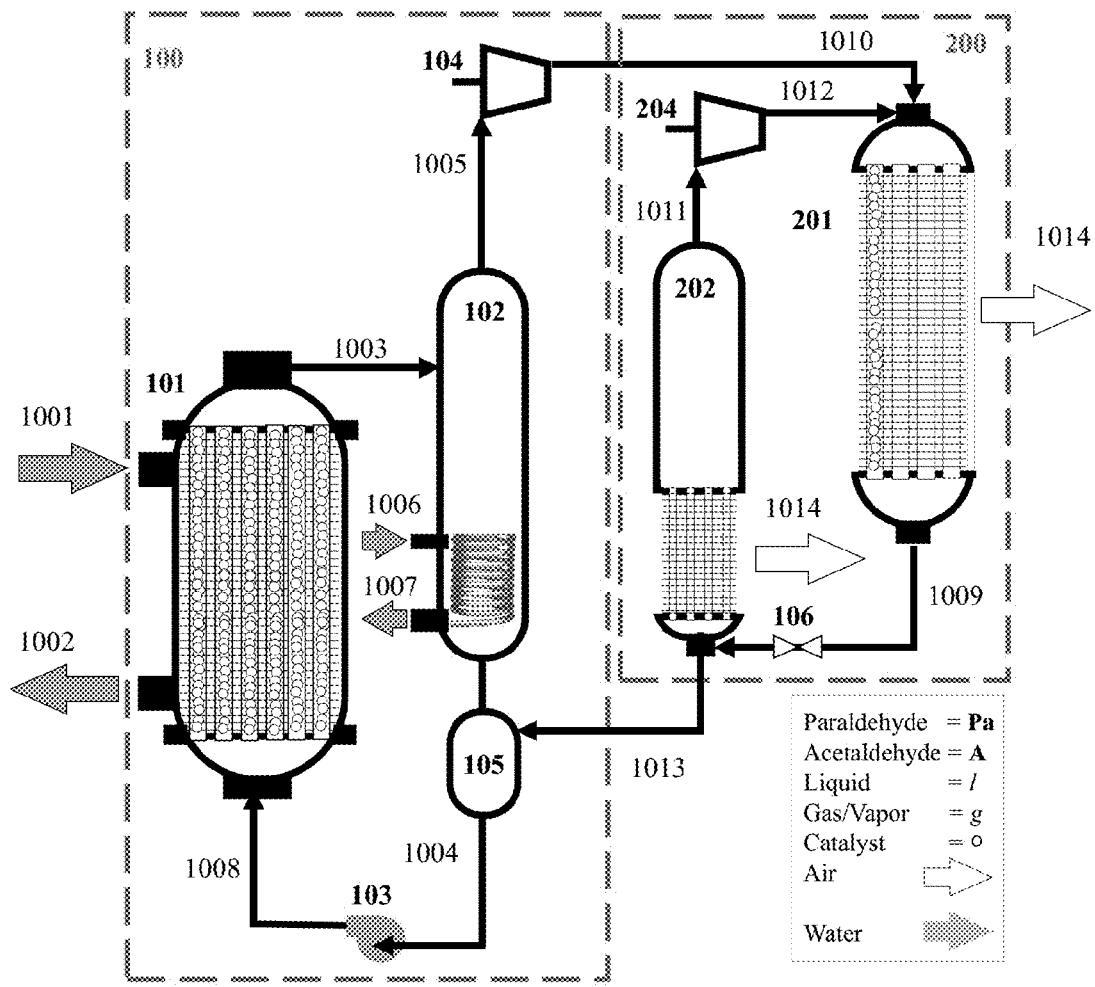
FIG. 8 is a schematic process flow diagram of an embodiment of the apparatus of the disclosed technology, using two PSUs.

In some embodiments, as shown in FIG. 8, the system comprises two or more PSUs, for example with a first PSU 102 positioned after the DCU 101, receiving streams of monomer rich vapor, and by its heat exchanger configuration further separating out monomer gas from polymer gas before conveying the vapor to the PHU 201, and a second PSU 202 positioned after the PHU 201, receiving streams of polymer rich liquid, and further separating out monomer liquid (which evaporates in PSU 202 to monomer gas) therefrom before conveying the polymer rich liquid to a storage tank or the DCU. The polymer gas/liquid from the first PSU 102 in this embodiment may then be joined with the polymer rich liquid stream 1013 being conveyed to the storage tanks for later depolymerization by the DCU, and the monomer gas from the second PSU 202 may be conveyed back to the PHU for polymerization. A second blower 204 may also be provided to actively remove monomer gas from the PSU. In this embodiment, either ambient air or condenser cooling water may be used to supply heat to the PSUs 102, 202.

In these embodiments source liquid 1001, 1006, such as coolant water is conveyed to the DCU and the PSU(s) by means of an external pump (not shown), such as the cooling water pump of the condenser. The flow rate of the source liquid through the heat exchanger tubes can be controlled by means of the pump so that the temperature of the source liquid upon discharge from the DCU tube is near or at the optimum temperature of the turbine (35-52° C.).

Inlet and outlet ports or valves may be positioned within the system of the disclosed technology to control fluid flow. The pumps used in association with or as part of the system of the disclosed technology may be controlled by a pump control system, which may receive signals from sensors within the DCU and the PSU, for example, and other heat exchangers, tanks and lines of the disclosed technology, to pump additional source liquid through the DCU or the PSU, additional polymer into the DCU, additional monomer rich gas from the DCU, and deliver polymer liquid to the CST, or from the CST to the PCU, or otherwise control the flow of liquids and vapor through the system of the disclosed technology to reach the desired source liquid temperature and optimize operation of the system.

The DCU 101 is an endothermic reactor, with a heat transfer surface (at its tubes, for example) allowing the reaction process to absorb heat from the source liquid cycled into the DCU tubes at 1001. The conversion from a polymer to a monomer liquid and the vaporization of the monomer liquid occur over a catalyst in the polymer coolant flow portion of the reactor; because this reaction is endothermic, it absorbs a significantly large amount of heat from the circulating source liquid, at the heat transfer surface. The polymer may be continuously cycled into the DCU vessel at 1008; when ambient temperatures make supplemental cooling desirable, the cool liquid polymer stored in the CST 302 is pumped into the DCU 101 from the stream 1011. A monomer rich vapor mixture is withdrawn from the DCU vessel at 1003, under a low pressure effect provided by the blower 104. This depletion of the monomer in the DCU forces the depolymerization reaction to promote further polymer depolymerization in reaching chemical equilibrium. For paraldehyde, depolymerization and vaporization occurs at any temperature at or above 4° C.; operating temperatures of 10-45° C. within the DCU appear to maximize depolymerization and vaporization. Flow rate of the paraldehyde into the DCU at 1008 in the range of 20-39 grams/minute, under pressure in the range of 5-9 psia, results in a cooling rate of 0.3-1.0 kW. The temperature of the source liquid as it exits the DCU at 1002 may be controlled by the flowrate of the source liquid, the polymer feed rate and the rate of withdrawal of the monomer rich vapor.

Figure 5:
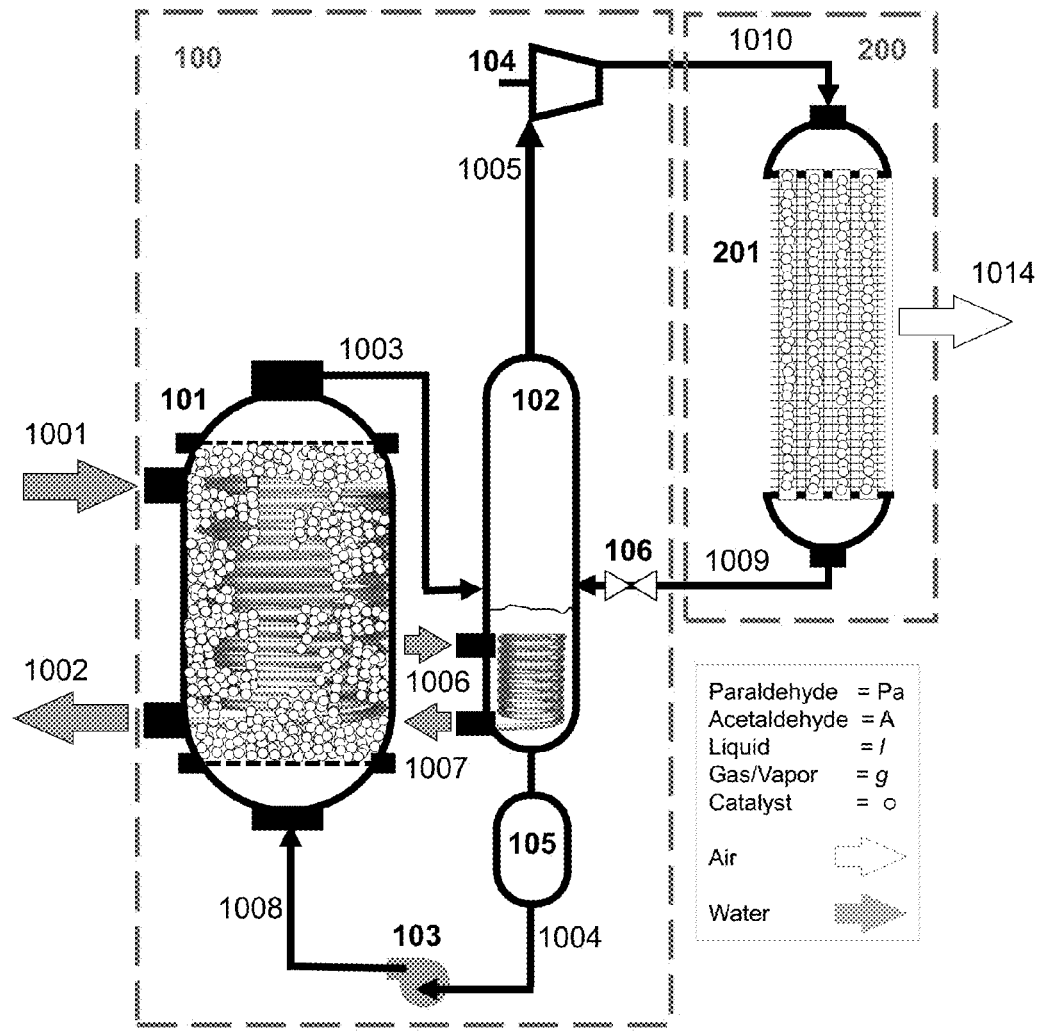
FIG. 5 is a schematic process flow diagram of another embodiment of the apparatus of the disclosed technology.

In the embodiment shown in FIGS. 4 and 5, under the influence of blower 104, the monomer rich vapor mixture (A(g) and Pa(g)) flows first to PSU 102, in stream 1003. The blower applies pressure to the tanks of the depolymerization assembly (and the cold storage assembly) in the range of 4-9 psia, to cause monomer gas separation and active removal of the monomer rich vapor from each of the DCU and the PSU. The blower exit pressure is in the range of 10-16 psia, forcing the vapor mixture from the PSU to flow into the PHU.

In this embodiment, the PSU 102 also acts as a buffer tank between the DCU 101 and the PHU 201, minimizing the impact of the sudden change in ambient conditions on the DCU operation, and allowing the system to operate continuously with no material imbalance. In the PSU 102, further separation of the monomer gas from the polymer gas occurs, using an independent stream of source liquid 1006, 1007 as the heat source, and further adding more cooling capacity to the system (wherein the stream of source liquid exiting the PSU may be mixed with the cooler source liquid exiting the DCU, or may be circulated through the DCU for further cooling). Specifically, the heat from the source liquid separates monomer gas and polymer liquid. The flow of condenser cooling water as a source liquid may be achieved by the condenser pump, and regulated to control the heat provided thereby within the PSU. The separated monomer rich stream then flows to the PHU 201, under the pumping pressures of the blower 104, in flow streams 1005 and 1010. The temperature of stream 1010 is intended to be close to ambient temperature. In some embodiments another heat exchanger is placed before the PHU to cool stream 1010 to near ambient temperatures, thereby limiting the reaction temperature in the PHU.

In the PHU 201, the monomer gas (A(g)) is polymerized over an acid catalyst to a polymer rich liquid (Pa(l)). The acid catalyst may be provided in a spherical (bead) form, packed inside of the heat exchanger as a packed bed reactor. Supporting metal screens or perforated mated plates may be positioned at both ends of the heat exchanger tube(s) to hold the catalyst bed in place, while allowing the monomer to flow through the catalyst bed. In the embodiment, where the polymer is paraldehyde, acetaldehyde is polymerized back to paraldehyde, over a catalyst, at a temperature range between about 40-60° C., and a pressure range between 10 and 16 psia.

This polymerization over an acid catalyst is an exothermic process, where the temperature of the monomer and polymer increases above ambient temperature. Heat is expelled at 1014 from the PHU to the ambient environment at a heat transfer surface. In some embodiments the PHU heat exchanger consists of multiple finned tubes, with ambient air being blown across the surface of the finned tubes. The fins on the tube increase heat transfer surface area and allow efficient heat rejection from the PHU to the atmosphere. A fan can be configured to either blow or pull air across the PHU for efficient heat removal at 1014.

In the embodiment shown in FIGS. 4 and 5, the PHU produces a polymer rich liquid mixture which flows back to the PSU 102 in flow stream 1009. The pressure differential between the PHU 201 and PSU 102 is regulated by blower 104 in the path of flow stream 1005, 1010 as hereinabove described, and through a pressure regulating valve, orifice, pump, or a combination of all or any of these devices, in the path of flow stream 1009. By means of the circulating plant condenser cooling water 1006, 1007, the PSU heat exchanger further vaporizes monomer gas from the polymer rich liquid mixture, and a more concentrated polymer rich liquid stream is then expelled from the PSU to the DST 301, in flow stream 1004. In some embodiments a second PSU is provided for this separation of monomer gas from the polymer rich liquid mixture, wherein the monomer gas is evaporated from the liquid and recirculated through the PHU 201.

It is noted that the monomer rich gas from the depolymerization assembly comprises up to 20%, or in some embodiments less than 10%, polymer gas; likewise, the polymer rich liquid from the polymerization assembly comprises up to 20%, or in some embodiments less than 10%, monomer liquid. The PSU(s) further separate the monomer from the polymer, in each of these states.

In the embodiment shown in FIGS. 2, 3 and 4, if necessary to cool the liquid polymer at night for next day operation, the liquid polymer is stored in the DST 301 and when the ambient air is cooler is pumped by pump 103 to PCU 303, by stream 1011 to 1012. The PCU 303 cools the liquid paraldehyde using the colder night ambient air 1015. The cooled liquid paraldehyde then flows to the CST 302 for storage, in flow stream 1013, and is ready for the next day operation and/or conveyance to the DCU by streams 1011 to 1008.

Programmable three-way valves may be used to control the flow pattern of the polymer rich liquid through and from the cold energy storage assembly, including for example (a) from the CST 302 to the DCU 101 (during the day's high ambient temperature), (b) from the DST 301 to the PCU 303 and CST 302 (during the cooler night ambient temperatures), (c) from the DST 301 to the DCU 101 (when the CST 302 is depleted, or the ambient temperature is not too high for the depolymerization reaction), or (d) to control the liquid pump 103 discharge flow either to the DCU 101 or PCU 303. Additional valves may be provided throughout the system to control fluid flow, such as for example, between the PHU and the PSU.

The catalyst within the DCU and the PHU may be the same or different acid based catalysts (except when used in a heat pump, as hereinafter described, wherein the catalysts must be the same), suitable for polymerization or depolymerization of the selected polymer. It is believed that most strong acid based catalysts would be suitable for use in the process of the disclosed technology. Examples of strong acid based catalysts suitable for use with the polymer paraldehyde include perflurosulfonic acid and sulfonic acid, such as Amberlyst 47, Amberlyst 15, Amberlyst, Amberlite, Amberjet, Purolite, Nafion NR and Nickle Sulfate. The catalyst resin (in all or some of the catalytic heat exchangers) may be acid, silica or activated carbon based. Favorable functions in a selected catalyst are high reaction rate with the selected polymer and high coefficient of heat transfer. Packing material, such as metal, may be incorporated into the resin bed to allow the use of less catalyst and maximize the heat transfer area within a tank.

As an example, Table 1 indicates the flow rate, temperature, pressure, enthalpy, composition and phases for the streams defined in FIG. 4. The thermodynamic states were calculated for a 100 $MW_{th}$ cooling plant and represent the conditions for steady state operation of the system.

Figure 6:
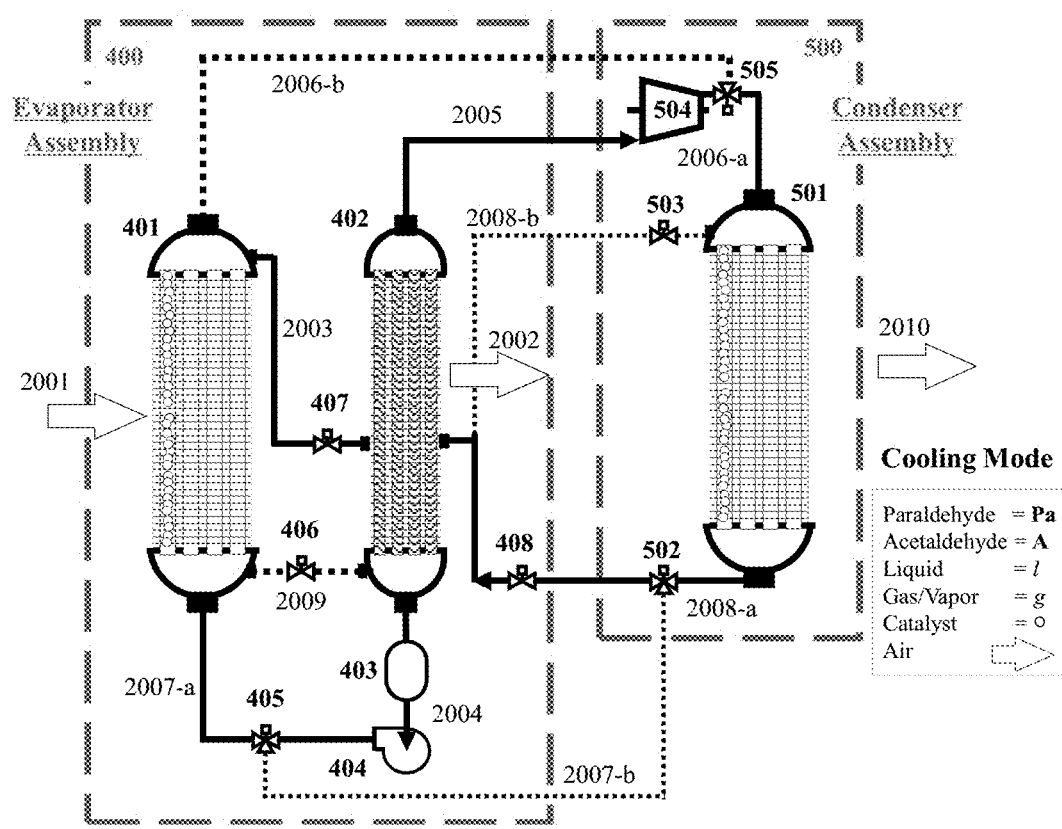
FIG. 6 is a schematic process flow diagram of another embodiment of the apparatus of the disclosed technology, using an uninterrupted heatpump in the cooling cycle.
Figure 7:
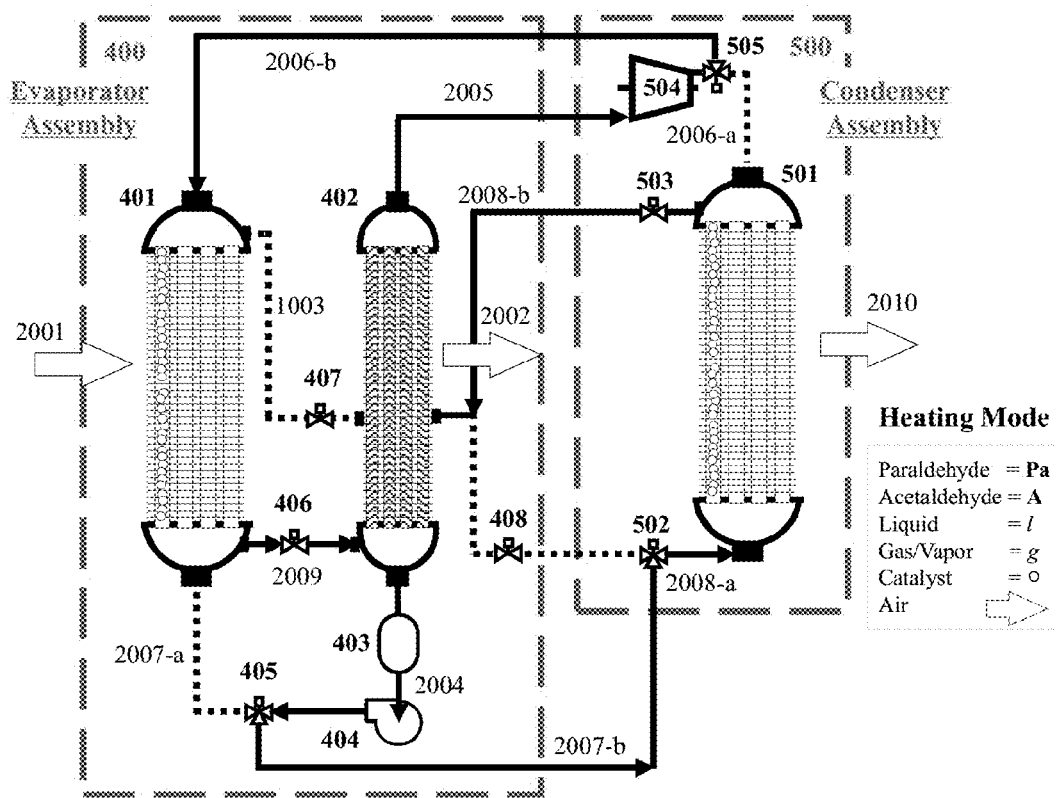
FIG. 7 is a schematic process flow diagram of the embodiment of FIG. 6, in the heating cycle.

In another embodiment of the disclosed technology, as shown in the schematic process flow diagram of FIGS. 6 and 7, a reversible heat pump space cooling and heating cycle apparatus and method is provided. In this embodiment two heat exchangers 401 and 501 are provided to depolymerize and polymerize the polymer/monomer conveyed through the system, in the traditional heat pump evaporator assembly 400 and condenser assembly 500. The components of this embodiment are similar to the components in the dry cooling embodiment without cold energy storage described above, with an expansion device 408 and several control valves 405, 406 and 407, wherein the heat exchanger 401 and the PSU 402 are air-to-liquid or to-multiphase heat exchangers.

As shown in FIG. 6, in the cooling mode the heat exchanger 401 of the evaporator assembly 400 functions as a depolymerization cooling unit, in liquid communication with a PSU 402, a polymer storing tank (PST) 403, a liquid pump 404, two two-way automatic control valves 406 and 407, and expansion valve 408. The automatic control valve 406 provides expansion valve functions when the flow is directed towards the PSU 402. In this mode the heat exchanger 501 of the condenser assembly functions as the polymerization heating unit, in liquid communication with two 3-way automatic control valves 502 and 505. Polymer and its depolymerized monomer flow among the heat exchangers 401 and 501, with a PSU 402 further separating the monomer and polymer, as described in the embodiments above, by flow lines 2003, 2005, 2006-*a*, 2008-*a*, 2004 and 2007-*a*. A blower, compressor or vacuum-pump 504 is provided to actively remove the monomer gas from the heat exchanger 401 and the PSU 402. The pressure between the second heat exchanger 501 and the PSU 402, and provide pressure to the second heat exchanger 501 in the cooling mode is regulated either by a pressure regulating valve, orifice, pump or a combination of all of these devices 408. Thereby, as air flows past the heat exchanger 401 and the PSU 402, it is cooled by the depolymerization of the polymer over a catalyst, and heat from the heat exchanger 501 is expelled to the environment.

In the heating mode (shown in FIG. 7), the flow is reversed, and the first heat exchanger 401 functions as the polymerization heating unit (providing an exothermic reaction of the monomer over a catalyst), and the second heat exchanger 501 functions as the depolymerization cooling unit (providing an endothermic reaction of the polymer over a catalyst). Valves 502, 503, 505, 405 and 406 reverse the

TABLE 1

| | | | | | | Comparison of Heat Capacity and Energy Use | | | | | |
|---|---|---|---|---|---|---|---|---|---|---|---|
| | Units | 1011 | 1008 | 1003 | 1005 | 1010 | 1009 | 1004 | 1013 | 1001 | 1002 |
| Phase | [—] | Liquid | Liquid | Vapor | Sat Vapor | Vapor | Sat. Liquid | Sat. Liq. | Liq | Liq | Liq |
| Quality | [kg Vap./kg Liq.] | 0.0 | 0.0 | 1.0 | 1.0 | 1.0 | 1.0 | 0.0 | 0.0 | 0.0 | 0.0 |
| $X_{Ac}$ | [massf liq.] | 0.1 | 0.1 | — | — | — | 0.2 | 0.1 | 0.1 | 0.0 | 0.0 |
| $X_{H2O}$ | [massf liq] | 0.0 | 0.0 | 0.0 | 0.0 | 0.0 | 0.0 | 0.0 | 0.0 | 1.0 | 1.0 |
| $Y_{Ac}$ | [massf vap] | — | — | 0.9 | 0.9 | 0.9 | — | — | — | — | — |
| Flow Rates | [kg/s] | 82.2 | 82.2 | 82.2 | 95.8 | 95.8 | 95.8 | 82.2 | 82.2 | 2,234 | 2,234 |
| Temp. | [° C.] | 38.0 | 38.0 | 30.0 | 30.0 | 62.0 | 39.0 | 40.0 | 38.0 | 40.0 | 30.0 |
| Pressure | [psi] | 7.4 | 7.4 | 7.4 | 7.4 | 13.0 | 13.0 | 7.4 | 7.4 | 31.5 | 29.1 |
| Enthalpy | ×10³ [kJ/kg] | −5.07 | −5.07 | −3.94 | −3.94 | −3.90 | −5.01 | −5.1 | −5.1 | −15.9 | −15.9 |

FIG. 2 shows a flow diagram of an embodiment of the disclosed technology as used in the condenser of a power plant; FIG. 3 shows a flow diagram of an embodiment of the disclosed technology as used as the condenser in a power plant.

The embodiment of FIG. 5 includes an uninterrupted cooling cycle apparatus, without cold energy storage. The components and operating parameters of this embodiment are similar to the components in the afore-described system having cold energy storage, but without the large storage tanks of the cold energy storage assembly. Specifically, in this embodiment the rich liquid polymer mixture is stored in a much smaller polymer storing tank (PST) 105, and then pumped to the DCU 101, providing uninterrupted cooling cycle operations. The PST may be sized to hold about one and one-half of the polymer needed for one cycle through the system of the present disclosure.

flow of the polymer/monomer, so that polymer and monomer flow among the heat exchangers 401 and 501 by flow lines 2008-b, 2005, 2006-b, 2009, 2004, 2007-b and 2008-a. The blower 504 is provided to actively remove the monomer gas from the heat exchanger 501 and the PSU 402. In the heating mode, the pressure between the first heat exchanger 401 and the PSU 402 is regulated through either a pressure regulating valve, orifice, pump or a combination of all of these devices 406. Thereby, as air 2001 flows past the heat exchanger 401, it is heated by the polymerization of the monomer over a catalyst, and heat from the environment 2010 is drawn in by heat exchanger 501, in its depolymerization endothermic reaction.

The potential impact of the dry-cooling system of the disclosed technology for cooling power plant condenser cooling water is the performance penalty imposed by air cooling when ambient temperatures are high. The performance penalty is the result of higher temperature cooling water returning to the condenser, raising condenser saturation pressure and lowering turbine output. In contrast, wet cooling allows cooling systems to operate at wet bulb temperature levels. Under similar condition, the web bulb temperature is lower than the dry bulb temperature, by an average of 3-5° C. As a result of this fundamental thermodynamic limitation, the use of prior art dry cooling systems result in an average of 2% loss of power output from the steam turbine compared to wet cooling operation, and up to 10% reduced power production under high ambient temperature conditions.

The system and methods of the disclosed technology eliminates the power production loss (performance penalty) due to high ambient temperatures present in traditional dry cooling technology. Further, the disclosed technology is a closed system, with zero water dissipation to the atmosphere, while providing cooling below ambient dry bulb temperature. The disclosed technology thereby provides a transformational and disruptive development compared to the traditional cold storage technologies, such as ice storage and room temperature phase change materials (PCMs). The system of the disclosed technology, with its practical 1,363 kJ/kg heat storage capacity, has 4 times the heat storage capacity of ice and 7 times the capacity of PCM systems, and uses significantly less energy than comparable technologies (see Table 2). These qualities lead to a smaller and cost effective cooling system.

TABLE 2

Comparison of Heat Capacity and Energy Use

| Phase Change Material | PureTemp (Entropy Solutions) | Paraffin | Salt Hydrates | Ice Storage | Disclosed Technology |
|---|---|---|---|---|---|
| Source | Vegetable | Petroleum | Minerals | Water | Polymer |
| Average Heat Storage, kJ/kg | 170-270 | 130-170 | 140-170 | 334 | up to 1330 |
| Energy Use in kWh/kWh Stored | n/a | n/a | n/a | ~1.3 | ~0.04 |

With prior art technology, the dry bulb ambient air temperature and the second law of thermodynamics set the lower limit of the steam condensation temperature within an air-cooled condenser. High ambient temperature excursions penalize power plant power output performance. The system of the disclosed technology provides an innovative solution to cool below ambient dry bulb temperature limit and address temperature excursions. The novel approach of combining depolymerization and re-polymerization to create a cycle that pumps heat from a power plant cooling system to the atmosphere effectively eliminates extensive water use and lowers the amount of energy required to provide cooling water for efficient turbine energy production. Likewise, certain reversible chemical reactions which produce endothermic and exothermic reactions within the condenser and ambient temperature ranges may be used in lieu of the depolymerization and polymerization reactions hereinabove described. When standalone or combined with current dry cooling technology (with other technology operating at ambient temperatures within 5° C. higher than the power plant design point), the system of the disclosed technology has the potential to make thermoelectric power plants independent from the nation's water supply infrastructure, operate with high efficiency, and conserve significant water resources for use in the agricultural, municipal, and industrial sectors.

The system of the disclosed technology can also serve other industrial cooling applications such as closed cooling loops for gas turbine inlet air cooling, lube oil cooling, steam cracker cooling for polymer production, and intercooling loop for large industrial compressors, as well as other applications as hereinabove described.

The invention claimed is:

1. A dry-cooling system useful in absorbing heat from a source liquid, the system comprising a depolymerization cooling unit (DCU) in fluid communication with a polymerization heating unit (PHU), wherein:

the DCU comprises a DCU heat exchanger, wherein the source liquid cycles through the DCU;
wherein a first acid based catalyst is disposed within the DCU, and the DCU receives a stream of a polymer liquid;
wherein contact of the polymer over the first catalyst within the DCU causes an endothermic reaction, converting the polymer to a monomer gas, and wherein the endothermic reaction draws heat from the source liquid as the source liquid cycles through the DCU, and
wherein the DCU expels a stream of the monomer gas; and the PHU comprises a PHU heat exchanger,
wherein a second acid based catalyst is disposed within the PHU, and the PHU receive the monomer gas,
wherein flow of the monomer gas over the second acid based catalyst causes an exothermic reaction, converting the monomer gas to the polymer liquid, and wherein the exothermic reaction generates heat which is rejected from the system through the PHU, and
wherein the PHU expels the stream of the polymer liquid for conveyance to the DCU.

2. The dry-cooling system of claim 1, the system further comprising a pump, in fluid communication between the PHU and the DCU, to convey the polymer liquid expelled from the PHU to the DCU.

3. The dry-cooling system of claim 1, further comprising a blower in fluid communication with the DCU and the PHU, wherein the blower is designed and configured to withdraw the monomer vapor from the DCU, under pressure of between about 4 to 9 psia, and convey the monomer vapor to the PHU under pressure of between about 13 to 16 psia.

4. The dry-cooling system of claim 1, wherein the polymer is paraldehyde.

5. The dry-cooling system of claim 1, wherein the first acid based catalyst and the second acid based catalyst are the same.

6. The dry-cooling system of claim 1, the system further comprising a first polymer separation unit (PSU) in fluid communication between the DCU and the PHU, wherein:
the PSU comprises a PSU heat exchanger, wherein the source liquid cycles through the PSU,
wherein the PSU receives from the DCU the stream of monomer gas, which stream also comprises a polymer gas,
wherein heat from the source liquid is transferred to the stream of polymer gas and monomer gas, to further separate the monomer gas from the polymer gas, and liquefy the polymer gas, and
wherein the PSU expels the monomer gas to the PHU.

7. The dry-cooling system of claim 6, further comprising a second PSU in fluid communication between the PHU and the DCU, wherein:
the second PSU receives from the PHU the stream of polymer liquid, which stream also comprises a monomer liquid,
wherein heat from the source liquid is transferred to the stream of the polymer liquid and the monomer liquid, to further separate the polymer liquid from the monomer liquid, and vaporize the monomer liquid to the monomer gas; and
wherein the second PSU expels the polymer liquid for conveyance back to the DCU.

8. The dry-cooling system of claim 6, wherein the PSU further receives from the PHU the stream of polymer liquid, which stream also comprises a monomer liquid, and
wherein heat from the source liquid is transferred to the stream of the polymer liquid and the monomer liquid, to further separate the polymer liquid from the monomer liquid, and vaporize the monomer liquid to the monomer gas, and
wherein the PSU expels the polymer liquid for conveyance back to the DCU.

9. The dry cooling system of claim 8, further comprising a cold energy storage assembly comprising a day storage tank (DST), a polymer cooling unit (PCU) and a cold-energy storage tank (CST), wherein:
the DST is in fluid communication with the first PSU to receive the polymer liquid, and with the PCU to expel the polymer liquid,
the PCU comprises a PCU heat exchanger, and receives from the DST the polymer liquid, and expels the cooler polymer liquid from the PCU, and
the CST is in fluid communication with the PCU to receive the cooler polymer liquid, and is further in fluid communication with the DCU for expelling the cooler polymer liquid to the DCU.

10. The dry-cooling system of claim 9, further comprising:
a pump in fluid communication between the PSU, the DST and the DCU,
a three-way valve in fluid communication with the pump, which three-way valve directs flow of the polymer liquid among the PSU, DCU, DST, PCU and CST.

11. A method for a dry-cooling system useful in absorbing heat from a source liquid, the method comprising the steps of:
providing a polymer and a source liquid;
in a first heat exchanger through which the source liquid flows, converting the polymer to a monomer vapor over a first catalyst, causing an endothermic reaction over the catalyst, the endothermic reaction drawing heat from the source liquid;
withdrawing the monomer vapor from the first heat exchanger;
in a second heat exchanger in fluid communication with the first heat exchanger, receiving the monomer vapor and converting the monomer vapor to a polymer liquid over a second catalyst, causing an exothermic reaction over the catalyst, the exothermic reaction expelling heat through the heat exchanger to an environment; and
discharging the polymer liquid from the second heat exchanger back to the first heat exchanger.

12. The process of claim 11, wherein the source liquid is power plant condenser water.

13. The process of claim 11, wherein the source liquid is exhausted steam from power plant steam turbine last stage.

14. The method for a polymerization cycle of claim 11, further comprising the steps of
in a third heat exchanger through which the source liquid also flows, receiving the monomer vapor from the first heat exchanger and the polymer liquid from the second heat exchanger, and further separating the monomer gas from the polymer liquid, using the source liquid as a heat source;
discharging the polymer liquid to the first heat exchanger, and discharging the monomer vapor to the second heat exchanger.

15. The method for a polymerization cycle of claim 14, further comprising the steps of:
in a first tank, receiving the polymer liquid from the third heat exchanger before it is delivered to the first heat exchanger;
in a fourth heat exchanger, receiving the polymer liquid from the first tank and flowing air past the fourth heat exchanger to lower the temperature of the polymer liquid;
in a second tank, receiving and storing the cooler polymer liquid from the fourth heat exchanger; and
discharging the stored cooler polymer liquid to the first heat exchanger.

16. A method for cooling a source liquid, the method comprising:
in a first heat exchanger through which a source liquid flows, depolymerizing a polymer in an endothermic reaction, thereby drawing heat from the source liquid and producing a monomer gas;
withdrawing the monomer gas from the first heat exchanger;
in a second heat exchanger, polymerizing the monomer gas, producing the polymer; and
delivering the polymer to the first heat exchanger.

17. A heat pump, comprising:
a polymer and a catalyst;
a first heat exchanger and a second heat exchanger, wherein the first and second heat exchangers are designed and alternatingly configured to process either an endothermic reaction or an exothermic reaction over the catalyst disposed within each of the heat exchangers, to produce respective product streams;
a polymer separation unit (PSU) in liquid communication with the heat exchangers, where the products streams are received and separated;
a blower in liquid communication with the heat exchangers and the PSU to actively remove a monomer gas from the heat exchanger processing the endothermic reaction; and a pump and a plurality of valves to generate and direct flow of the products through the heat exchangers, the PSU and the blower.

\* \* \* \* \*

UNITED STATES PATENT AND TRADEMARK OFFICE
CERTIFICATE OF CORRECTION

PATENT NO. : 9,702,596 B2
APPLICATION NO. : 15/370355
DATED : July 11, 2017
INVENTOR(S) : Aly H. Shaaban et al.

Page 1 of 1

It is certified that error appears in the above-identified patent and that said Letters Patent is hereby corrected as shown below:

In the Specification

On Column 1, Line 5, before the "BACKGROUND OF THE DISCLOSED TECHNOLOGY," please insert the following paragraph:

-- STATEMENT OF GOVERNMENTAL SUPPORT
This invention was made with government support under DE-AR0000579 awarded by the United States Department of Energy. The government has certain rights in the invention. --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*